US009965905B1

(12) United States Patent
Se (10) Patent No.: US 9,965,905 B1
(45) Date of Patent: May 8, 2018

(54) ENGINE-STATE DETECTION DEVICE AND ENGINE-STATE DETECTION METHOD

(71) Applicant: MSI COMPUTER (SHENZHEN) CO., LTD., Shenzhen, Guangdong Province (CN)

(72) Inventor: Ming Chung Se, New Taipei (TW)

(73) Assignee: MSI COMPUTER (SHENZHEN) CO., LTD., Shenzhen (CN)

( * ) Notice: Subject to any disclaimer, the term of this patent is extended or adjusted under 35 U.S.C. 154(b) by 0 days. days.

(21) Appl. No.: 15/640,715

(22) Filed: Jul. 3, 2017

(30) Foreign Application Priority Data

May 19, 2017 (TW) .............................. 106116744 A (51) Int. Cl.
*G07C 5/08* (2006.01)
*B60R 16/033* (2006.01)
*G01M 15/02* (2006.01)
*B60K 16/00* (2006.01)

(52) U.S. Cl.
CPC .............. *G07C 5/08* (2013.01); *B60R 16/033* (2013.01); *G01M 15/02* (2013.01)

(58) Field of Classification Search
CPC ........ G07C 5/08; B60R 16/033; G01M 15/02; B60K 16/00

USPC ........................................................... 701/99
See application file for complete search history.

(56) References Cited

U.S. PATENT DOCUMENTS

| 2011/0139117 A1* | 6/2011 | Kar ....................... F02D 11/105 |
| | | 123/395 |
| 2013/0073188 A1* | 3/2013 | Rosel ..................... F02D 41/20 |
| | | 701/105 |

* cited by examiner

*Primary Examiner* — Tan Q Nguyen
(74) *Attorney, Agent, or Firm* — Maschoff Brennan (57) ABSTRACT

An engine state detection device adapted to a vehicle engine is electrically connected to a battery module providing a power signal is disclosed. The device includes a windowed comparison circuit and a controller. The windowed comparison circuit is configured to receive the power signal and convert the power signal to one of a plurality of sets of subject signals according to one of a plurality of level profiles. Each of the plurality of level profiles is related to a respective one of the plurality sets of subject signals. The controller is configured to perform an algorithm on the set of subject signal converted from the power signal for generating a combination signal, and determine a state of the vehicle engine according to the set of subject signal converted and the combination signal. The level profile on which the windowed comparison circuit depends is determined by the controller.

11 Claims, 8 Drawing Sheets

ENGINE-STATE DETECTION DEVICE AND ENGINE-STATE DETECTION METHOD

CROSS-REFERENCE TO RELATED APPLICATIONS

This non-provisional application claims priority under 35 U.S.C. § 119(a) on Patent Application No(s). 106116744 filed in Taiwan, R.O.C. on May 19, 2017, the entire contents of which are hereby incorporated by reference.

TECHNICAL FIELD

The disclosure relates to an engine-state detection and an engine-state method, more particularly to an engine-state detection and an engine-state method using level profiles.

BACKGROUND

Society of human beings has entered into the age of technological industry as time goes on. In this age, a variety of technological products are inseparable from the lives of people. Among the technological products, vehicles are considered as important products in the age of technological industry because the vehicles are necessary tools for most people in daily lives. In fact, vehicles are constructed by using a variety of hardware components and software programs. When a vehicle engine is started by a user, the vehicle system would drive the loading procedures of a variety of software programs to be implemented such that the vehicle operates functionally. In traditional, a set of ACC cables must be disposed within the vehicle. The so-called ACC cables are used for controlling and activating functions of electronics control units (ECUs) (e.g. loading software programs into relative hardware components). As such, all of ECUs have to be connected to the set of ACC cables for activating the internal components within the ECU and turning off power consumptions of the components to avoid negative effects to the next engine start caused by running out of the vehicle battery. However, disposing the set of ACC cables would cause wastes of manpower and costs, and also occupies the internal rooms of the ECUs. An ideal and convenient engine-state detection device and method are provided in the present disclosure for the ECUs. Using the engine-state detection device and method does not require the set of ACC cables be connected to the ECUs and not to directly measure the DC voltage of the vehicle battery for determining the engine state.

SUMMARY

According to one embodiment of the present disclosure, an engine-state detection device adapted to a vehicle engine, with a battery module electrically connected to the vehicle engine for providing a power signal is disclosed. The engine-state detection device includes a windowed comparison circuit and a controller. The windowed comparison circuit is configured to receive the power signal and convert the power signal to one of a plurality of sets of subject signals depending on one of a plurality of level profiles, wherein each of the plurality of level profiles is related to a respective one of the plurality of sets of subject signals. The controller is electrically connected to the windowed comparison circuit and configured to perform an algorithm for the one of the plurality of sets of subject signals converted from the power signal for generating a combination signal correspondingly, and determine a state of the vehicle engine according to the one of the plurality of sets of subject signals and the combination signal generated correspondingly, wherein the level profile on which the windowed comparison circuit depends is determined by the controller. The one of the plurality of sets of subject signals includes a first digital signal and a second digital signal, the level profile on which the windowed comparison circuit depends includes a first reference signal and a second reference signal, the first reference signal has an upper bound value related to the first digital signal, and the second reference signal has an lower bound value related to the second digital signal.

According to one embodiment of the present disclosure, an engine-state detection method adapted to a combination of an engine-state detection device and a vehicle engine, with a battery module electrically connected to the vehicle engine for providing a power signal thereto is disclosed. The engine-state detection method includes the following steps: loading a first level profile for converting the power signal to a first set of subject signals according to a first level profile when the vehicle engine is in a triggering state; determining whether the vehicle engine enters an initial state according to the first set of subject signals and a first combination signal generated correspondingly; loading a second level profile for converting the power signal to a second set of subject signals when it is determined that the vehicle engine enters the initial state; determining whether the vehicle engine enters an operation state according to the second set of subject signals and a second combination signal generated correspondingly; loading a second level profile for converting the power signal to a third set of subject signals when it is determined that the vehicle engine enters the operation state; determining whether the vehicle engine returns an off-state according to the third set of subject signals and a third combination signal generated correspondingly; loading a triggering level profile for converting the power signal to a set of triggering subject signals when it is determined that the vehicle engine enters the off-state; determining whether the vehicle engine returns to the triggering state according to the set of triggering subject signals and a triggering combination signal generated correspondingly. Each of the first set of subject signals, the second set of subject signals and the third set of subject signals has a first digital signal and a second digital signal, with each of the first level profile, the second level profile and the third level profile having an upper bound value and a lower bound value correspondingly, each of the upper bound values is configured to compare to the power signal for generating one of the first digital signal of the first set of subject signals, the first digital signal of the second set of subject signals and the first digital signal of the third set of subject signals, and each of the lower bound values is configured to compare to the power signal for generating one of the second digital signal of the first set of subject signals, the second digital signal of the second set of subject signals and the second digital signal of the third set of subject signals.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
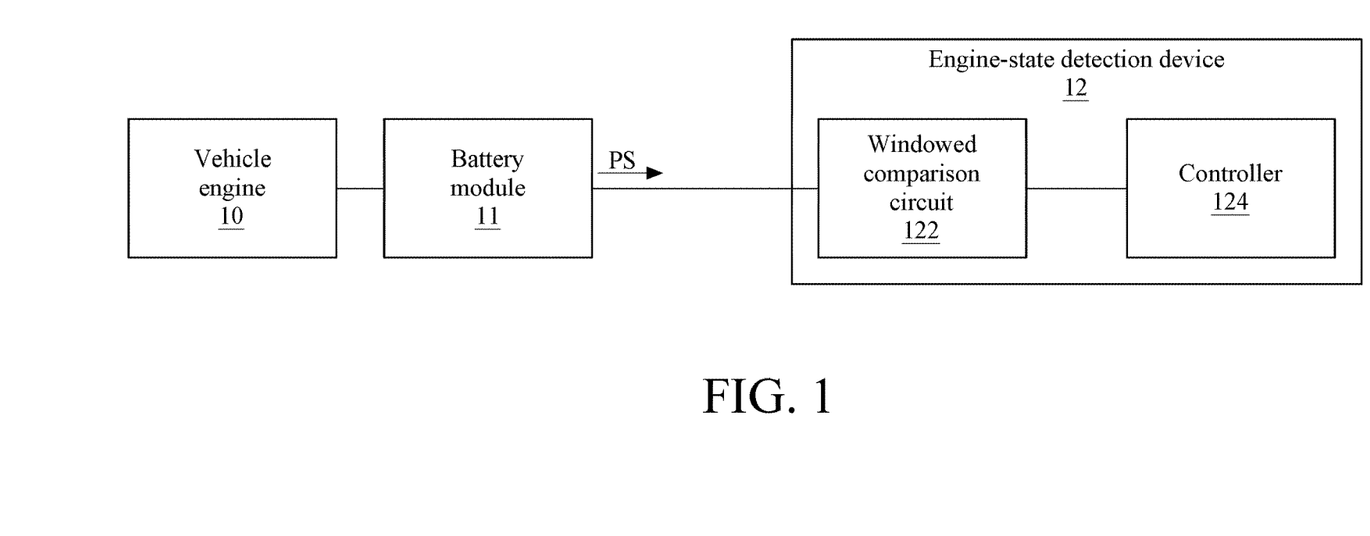
FIG. 1 is a block diagram of an engine-state detection device and a vehicle engine as well as a battery module according to one embodiment of the present disclosure.

Please refer to FIG. 1, which is a block diagram of an engine-state detection device and a vehicle engine as well as a battery module according to one embodiment of the present disclosure. As shown in FIG. 1, a vehicle engine 10 is electrically connected to a battery module 11 and an engine-state detection device 12 is electrically connected to the battery module 11. The engine-state detection device 12 includes a windowed comparison circuit 122 and a controller 124. The windowed comparison circuit 122 is configured to receive a power signal PS form the battery module 11. In practice, the battery module 11 could be a car battery used for providing power for the vehicle engine 10 to operate. The engine-state detection device 12 is capable of detecting the state of the vehicle engine 10 through the power signal PS provided by the battery module 11 in FIG. 1. As shown in FIG. 1, the windowed comparison circuit 122 converts the power signal PS to one of a plurality of sets of subject signals depending on one of a plurality of level profiles. The controller 124 is electrically connected to the windowed comparison circuit 122 and the controller 124 is configured to perform an algorithm for the set of subject signals converted from the power signal PS in order to generate a combination signal correspondingly. The controller 124 is capable of detecting the state of vehicle engine according to the set of subject signal converted and the combination signal. In practice, the controller 124 is further configured to output the determination result to a vehicle computer or ECU for controlling the vehicle correspondingly. The level profile on which the windowed comparison circuit 122 depends is determined by the controller 124.

Specifically, the controller 124 selects one level profile among the plurality of level profiles and loads the level profile into the windowed comparison circuit 122, so that the windowed comparison circuit 122 is able to convert the power signal PS to a set of subject signals according to the selected level profile. The subject signals converted include a first digital signal and a second digital signal, and the level profile on which the windowed comparison circuit 122 depends includes a first reference signal and a second reference signal. The first reference signal has an upper bound value related to the first digital signal, and the second reference signal has a lower bound value related to the second digital signal. In practice, originally the power signal PS is an analog signal, and the analog signal could be converted to two digital signals through a signal conversion performed by the windowed comparison circuit 122. The two digital signals are the first digital signal and the second digital signal respectively. The waveform and the frequency of the first digital signal are determined according to the upper bound value of the first reference signal, and the waveform and the frequency of the second digital signal are determined according to the lower bound value of the second reference signal.

Figure 2A:
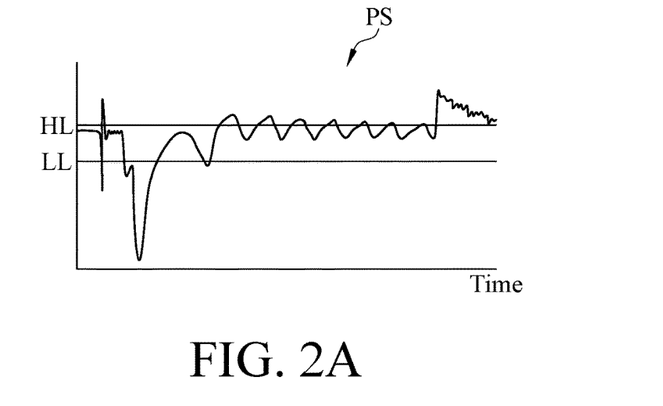
FIG. 2A is a waveform of the power signal according to one embodiment of the present disclosure.
Figure 2B:
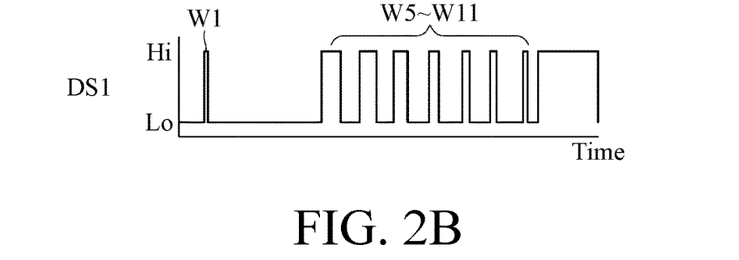
FIG. 2B is waveform of the first digital signal according to one embodiment of the present disclosure.
Figure 2C:
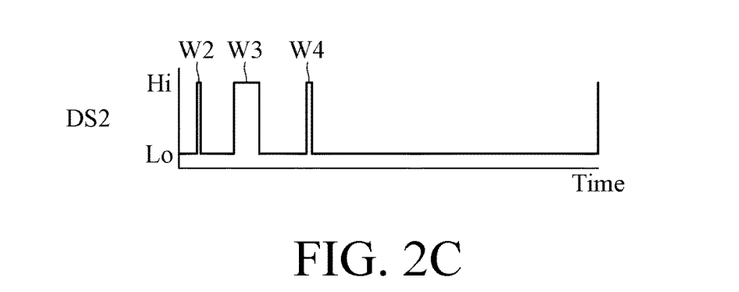
FIG. 2C is waveform of the second digital signal according to one embodiment of the present disclosure.
Figure 2D:
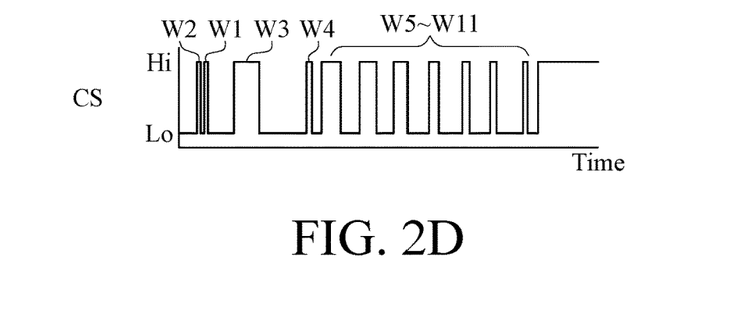
FIG. 2D is a waveform of the combination signal according to one embodiment of the present disclosure.

The controller 124 analyzes the waveform and the frequency of the first digital signal and the waveform and the frequency of the second digital signal as well as the waveform and the frequency of the combination signal for determining the state of the vehicle engine. For example, please refer to FIG. 2A-2D. FIG. 2A is a waveform of the power signal according to one embodiment of the present disclosure. FIG. 2B and FIG. 2C are respectively waveforms of the first digital signal and the second digital signal according to one embodiment of the present disclosure. First of all, the controller 124 selects one level profile among the plurality of level profiles and loads the level profile into the windowed comparison circuit 122. The loaded level profile includes a first reference signal V1 having an upper bound value HL and a second reference signal V2 having a lower bound value LL, as shown in 2A. The windowed comparison circuit 122 outputs a first digital signal DS1 according to the upper bound value HL and outputs a second digital signal DS2 according to the lower bound value LL as shown in FIG. 2B and FIG. 2C. Then the windowed comparison circuit 122 further sends the first digital signal DS1 and the second digital signal DS2 to the controller 124. Please refer to FIG. 2D, which is a waveform of the combination signal according to one embodiment of the present disclosure. When the controller 124 receives the first digital signal DS1 and the second digital signal DS2, an algorithm is performed for the first digital signal DS1 and the second digital signal DS2, so that a combination signal CS is generated, as shown in FIG. 2D.

Then, the controller 124 determines the state of the vehicle engine 10 according to the waveforms and the frequencies of the first digital signal DS1 and the second digital signal DS2 as well as the combination signal CS. For example, when the first digital signal DS1 has the impulse waveform W1 and the second digital signal DS2 has an impulse waveform W2 and the combination signal CS indicates the impulse waveform W2 is earlier than the impulse waveform W1 in the timeline, and the second digital signal DS2 has an impulse waveform W3 and W4 in a period of time, and the first digital signal DS1 has no impulse waveform in the period of time. When there is no impulse waveform in this period of time, the controller 124 is able to determine that the vehicle engine is running with a heavy loading. When the first digital signal DS1 has a plurality of impulse waveforms W5-W11 in a period of time and the second digital signal DS2 does not have any impulse waveform in this period of time, the controller 124 is able to determine that the vehicle engine is running with a light loading. Therefore, by the engine-state detection device of the present disclosure, the vehicle system is capable of obtaining the engine state efficiently and thereby selectively loading software programs into the vehicle without using a set of ACC cables for detecting the engine state. Therefore, the costs for installing the ACC cables are eliminated.

It is noted that those level profiles mentioned above can be acquired from another vehicle having the same model as the vehicle using the vehicle engine 10. More specifically, assume that the model of the vehicle using the vehicle engine 10 is M-type. The user is able to collect an amount of data related to another vehicle having the M-type model by installing specific tool programs and a set of cables. When the amount of data collected reaches a certain level, the level profiles for the vehicle having the M-type model are determined. Those level profiles are adapted to all vehicles having the M-type model.

Figure 3:
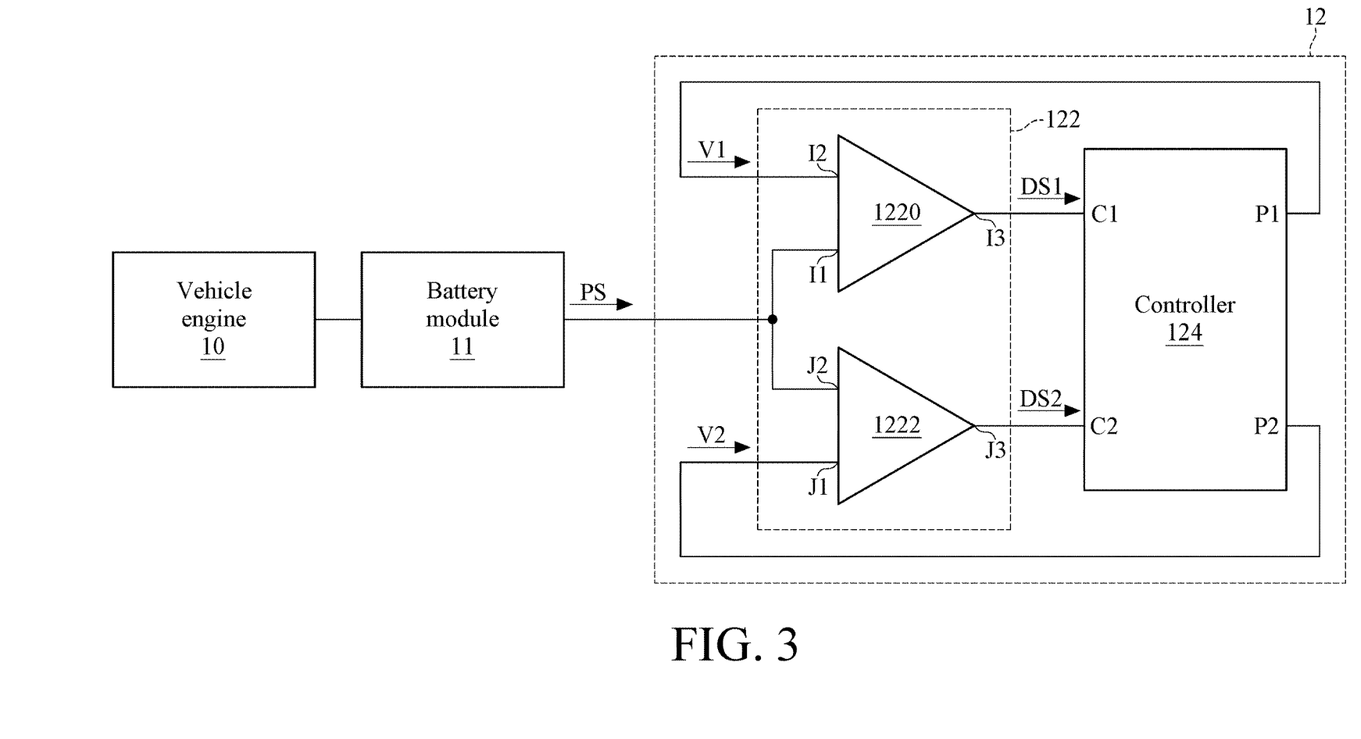
FIG. 3, which is an internal circuit diagram of the windowed comparison circuit according to the embodiment of FIG. 1.

Please refer to FIG. 3, which is an internal circuit diagram of the windowed comparison circuit according to the embodiment of FIG. 1. The difference between FIG. 1 and FIG. 3 lies in that, the windowed comparison circuit 122 includes a first comparator 1220 and a second comparator 1222. The first comparator 1220 has a first end I1, a second end I2 and a third end I3. The first end I1 of the first comparator 1220 is configured to receive the power signal PS, and the second end I2 of the first comparator 1220 is configured to receive the first reference signal V1 from the first output terminal P1 of the controller 124. The first comparator 1220 is configured to generate the first digital signal DS1 according to the upper bound value HL of the first reference signal V1 and the power signal PS, as shown in FIG. 2B. The first digital signal DS1 is sent to the first input terminal C1 of the controller 124 through the third end I3 of the first comparator 1220. On the other hand, the second comparator 1222 has a first end J1, a second end J2 and a third end J3. The first end J1 of the second comparator 1222 is configured to receive a second reference signal V2 from a second output terminal P2 of the controller 124. The second end J2 of the second comparator 1222 is configured to receive the power signal PS. The second comparator 1222 converts the power signal PS to a second digital signal DS2 according to a lower bound value LL of the second reference signal V2, as shown in FIG. 2C. The second digital signal DS2 is sent to a second input terminal C2 of the controller 124 through the third end J3 of the second comparator 1222. Specifically, by setting up the first comparator and the second comparator, the power signal PS presenting in the form of an analog signal is converted to the first digital signal DS1 and the second digital signal DS2. It is found in FIG. 2A to FIG. 3 that the upper bound value UL and the lower bound value LL would determine the first digital signal DS1 and the second digital signal DS2. In this embodiment, after the controller 124 receives the first digital signal DS1 and the second digital signal DS2, the controller 124 performs a logical algorithm, such as OR gate, for the first digital signal DS1 and the second digital signal DS2, for generating the combination signal CS as shown in FIG. 2D. In this embodiment, the logical algorithm could be an artificial intelligence self-learning algorithm. For example, the controller 124 adjusts the determination weights of the algorithm for improving the accuracy of determinations, adapting to the condition of the vehicle battery aging as well as the changes of accessory devices by accessing characteristic trends and parameters of signals which are considered to be successful or failed.

In one embodiment, the level profiles mentioned in FIG. 1 and FIG. 2 includes a first level profile, a second level profile and a third level profile. When the windowed comparison circuit 122 converts the power signal PS to the set of subject signals according to the first level profile and the controller 124 determines that the vehicle engine 10 enters an initial state according to the set of subject signals and the combination signal correspondingly generated by performing the algorithm for the set of subject signals, the controller 124 adjusts the first level profile for generating a second level profile. When the windowed comparison circuit 122 converts the power signal PS to another set of subject signals according to the second level profile and the controller 124 determine that the vehicle engine 10 enters an operation state according to the another set of subject signals and the combination signal correspondingly generated by performing the algorithm for the another set of subject signals, the controller 124 adjusts the second level profile for generating a third level profile. In one embodiment, when the windowed comparison circuit 122 converts the power signal to further another set of subject signals according to the third level profile, the controller 124 determines whether the vehicle engine 10 returns to an off-state according to the further another set of subject signals and the combination signal correspondingly generated by performing the algorithm for the further another set of subject signals. In one example, the upper bound value of the third level profile is greater than the upper bound value of the first level profile and also greater than the upper bound value of the second level profile. The lower bound value of the third level profile is greater than the lower bound value of the first level profile and also greater than the lower bound value of the second level profile. The detailed descriptions related to determinations for the vehicle engine 10 according to the first level profile, the second level profile and the third level profile will be given in the following paragraphs.

Figure 4:
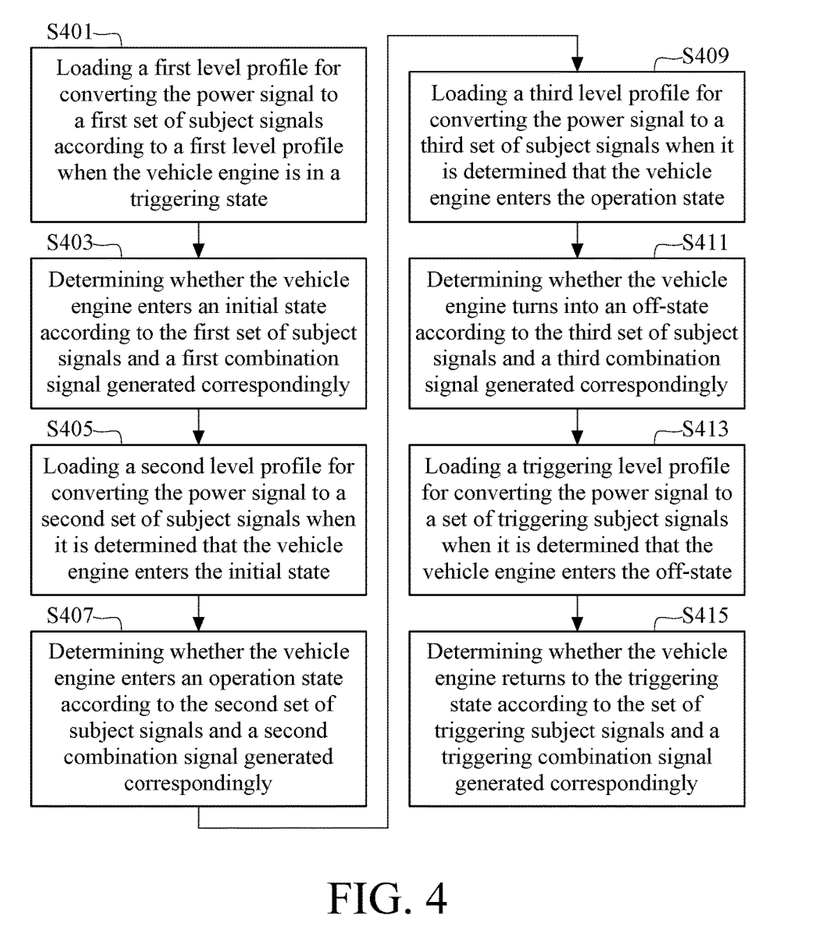
FIG. 4 is flow chart of an engine-state detection method according to one embodiment of the present disclosure.
Figure 5:
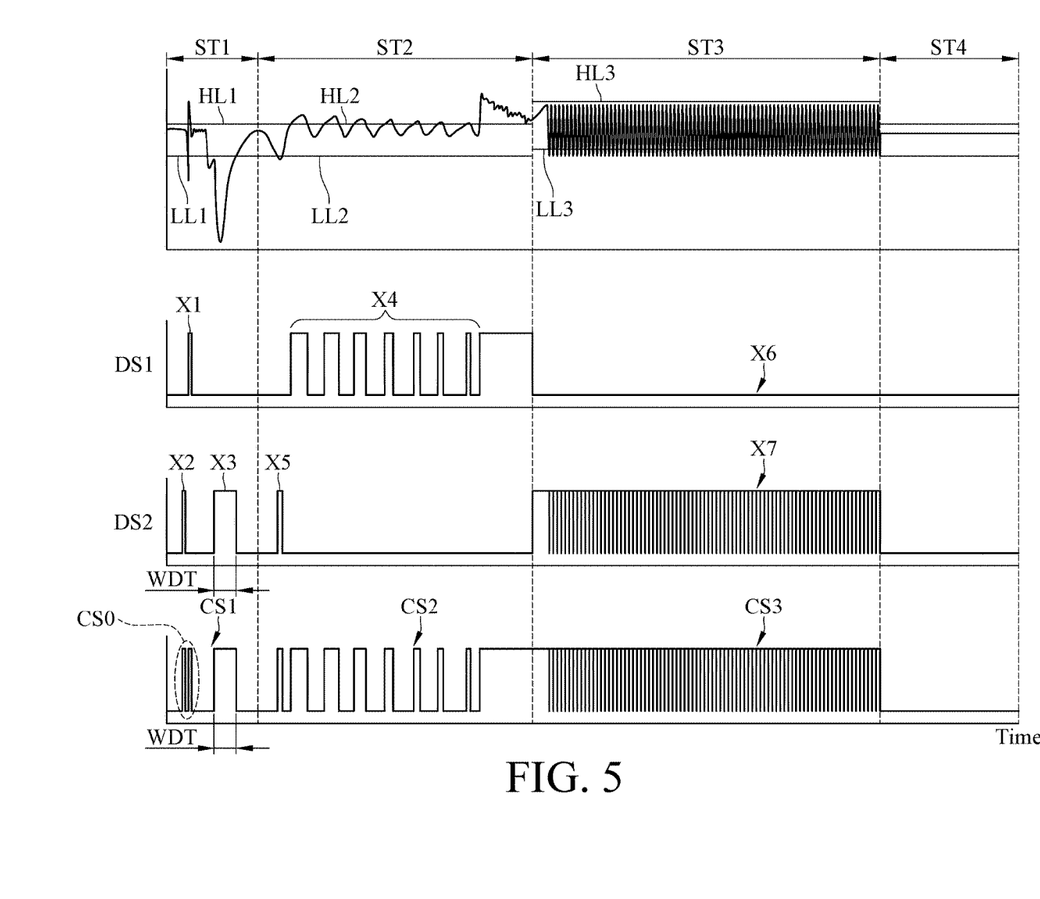
FIG. 5 is a waveform of a power signal according to one embodiment of the present disclosure.

Please refer to FIG. 4 and FIG. 5. FIG. 4 is a flow chart of an engine-state detection method according to one embodiment of the present disclosure. The method is adapted to the engine-state detection device 12 and the vehicle engine 10 as well as the battery module 11 shown in FIG. 1 and FIG. 2. FIG. 5 is a waveform of a power signal according to one embodiment of the present disclosure. As shown in FIG. 4 and FIG. 5, in step S401, in a triggering state ST1 of the vehicle engine 10, the controller 124 loads a first level profile into the windowed comparison circuit 122 for converting the power signal PS to a first set of subject signals. In the embodiment, the first level profile has the upper bound value HL1 and the lower bound value LL1, so that the first digital signal DS1 included in the first set of subject signals output by the windowed comparison circuit 122 has an impulse waveform X1, and the second digital signal DS2 included in the first set of subject signals output by the windowed comparison circuit 122 has an impulse waveform X2 and another impulse waveform X3. The controller 124 further performs an algorithm (OR gate) for the first digital signal DS1 having the impulse waveform X1 and the second digital signal DS2 having the impulse waveform X2 and the impulse waveform X3 for generating a first combination signal CS1. Then, in step S403, the controller 124 determines whether the vehicle engine 10 enters an initial state ST2 according to the first set of subject signals and the first combination signal CS1.

After the controller 124 determine that the vehicle engine 10 enters the initial state ST2, the second level profile is loaded into the windowed comparison circuit 122 for converting the power signal PS to a second set of subject signals in step S405. In the embodiment, the second level profile has an upper bound value HL2 and a lower bound value LL2, so that the first digital signal DS1 included in the second set of subject signals output by the windowed comparison circuit 122 has an impulse waveform X4 and the second digital signal DS2 included in the second set of subject signals output by the windowed comparison circuit 122 has an impulse waveform X5. The controller 124 further performs an algorithm (OR gate) for the first digital signal DS1 having the impulse waveform X4 and the second digital signal DS2 having the impulse waveform X5 for generating a second combination signal CS2. Then, in step S407, the controller 124 determines whether the vehicle engine 10 enters an operation state ST3 according to the second set of subject signals and the second combination signal CS2.

Then, in step S409, after the controller 124 determined that the vehicle engine 10 enters the operation state ST3, a third level profile is loaded into the windowed comparison circuit 122 for converting the power signal PS to a third set of subject signals. In this embodiment, the third level profile has an upper bound value HL3 and a lower bound value LL3, so that the first digital signal DS1 included in the third set of subject signals output by the windowed comparison circuit 122 has an impulse waveform X6, and the second digital signal DS2 included in the third set of subject signals output by the windowed comparison circuit 122 has an impulse waveform X7. The controller 124 further performs an algorithm (OR gate) for the first digital signal DS1 having the impulse waveform X6 and the second digital signal DS2 having the impulse waveform X7 for generating a third combination signal CS3. Then, in step S411, the controller 124 determines whether the vehicle engine 10 turns to an off-state ST4 according to the third set of subject signals and the third combination signal CS3. Then, in step S413, after the controller 124 determines that the vehicle engine 10 enters the off-state ST4, a triggering level profile is loaded into the windowed comparison circuit 122 for converting the power signal PS to a set of triggering subject signals. More specifically, as shown in FIG. 5, the triggering level profile has an upper bound value HL1 and a lower bound value LL1, so that the first digital signal DS1 included in the set of triggering subject signals output by the windowed comparison circuit 122 has the impulse waveform X1, and the second digital signal DS2 included in the set of triggering subject signals output by the windowed comparison circuit 122 has the impulse waveform X2. The controller 124 further performs an algorithm (OR gate) for the first digital signal DS1 having the impulse waveform X1 and the second digital signal DS2 having the impulse waveform X2 for generating a triggering combination signal CS0. In the following step S415, the controller 124 determines whether the vehicle engine 10 returns to the triggering state ST1 according to the set of triggering subject signals and the triggering combination signal CS0. If it does, then return to step S401. In one embodiment, as shown in FIG. 5, the upper bound value HL3 of the third level profile is greater than the upper bound value HL1 of the first level profile and also greater than the upper bound value HL2 of the second level profile. The lower bound value LL3 of the third level profile is greater than the lower bound value LL1 of the first level profile and also greater than the lower bound value LL2 of the second level profile.

As mentioned in previous paragraphs, the upper bound value and the lower bound value of the first level profile, the upper bound value and the lower bound value of the second level profile, and the upper bound value and the lower bound value of the third level profile are determined from vehicles of the model the same as the vehicle using the vehicle engine 10. In practice, the upper bound value and the lower bound value of the first level profile, the upper bound value and the lower bound value of the second level profile, and the upper bound value and the lower bound value of the third level profile are determined through the duty cycle computed by using PWM techniques, or determined by inputting values DAC. For example, first of all, a user installs a specific tool programs and a set of cables in a vehicle. Secondly, a target duty cycle is preset by calculating a ratio of the time occupied by impulse waveforms of digital signals to the overall time. In an example, the target duty cycle could be preset to be 25%-35%. Then, keep adjusting the upper bound value HL1 of the first level profile and the upper bound value HL2 of the second level profile such that the duty cycle regarding the impulse waveforms (e.g. impulse waveforms X1 and X4 in FIG. 5) of the digital signals conforms to the target duty cycle which is 25~35%. Similarly, another target duty cycle is preset by calculating a ratio of the time occupied by impulse waveforms of digital signals to the overall time. In the example, the another target duty cycle could be preset to be 10~15%. Then, keep adjusting the lower bound value LL1 of the first level profile and the lower bound value LL2 of the second level profile such that the duty cycle regarding the impulse waveforms (e.g. impulse waveforms X2, X3 and X5 in FIG. 5) of the digital signals conforms to the another target duty cycle which is 10~15%. By the above method, the first level profile and the second level profile suitable for vehicles having this kind of model could be determined. The third level profile is determined according to the frequency of the vehicle engine 10 in the operation state. More specifically, the upper bound value HL3 and the lower bound value LL3 of the third level profile are adjusted such that the frequency of the combination signal generated from the two signals conform to the frequency of the vehicle engine 10 approximately. In other words, when the frequencies of the combination signal generated from the two signals generated according to the upper bound value HL3 and the lower bound value LL3 of the third level profile is substantially the same as the frequency of the vehicle engine 10 in the operation state, the third level profile is adapted to the vehicle having this kind of model. In another practical operation, the first level profile, the second level profile, the third level profile and the triggering level profile are determined by an artificial intelligence self-learning algorithm.

Figure 6A:
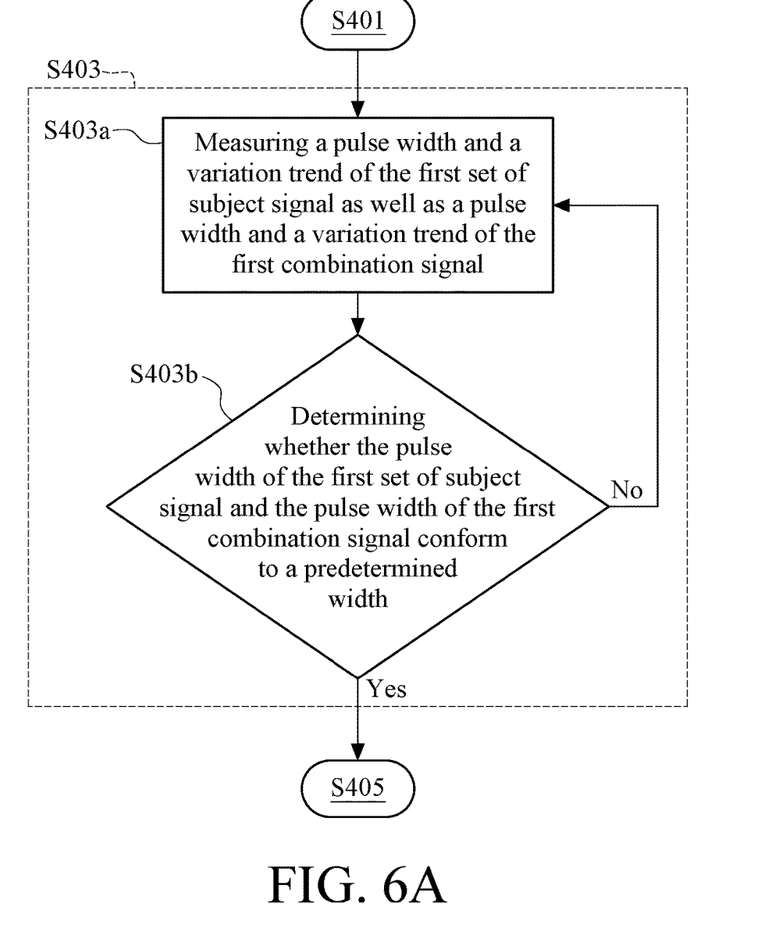
FIG. 6A is a flow chart of engine-state detection methods according to one embodiment of the present disclosure.
Figure 6B:
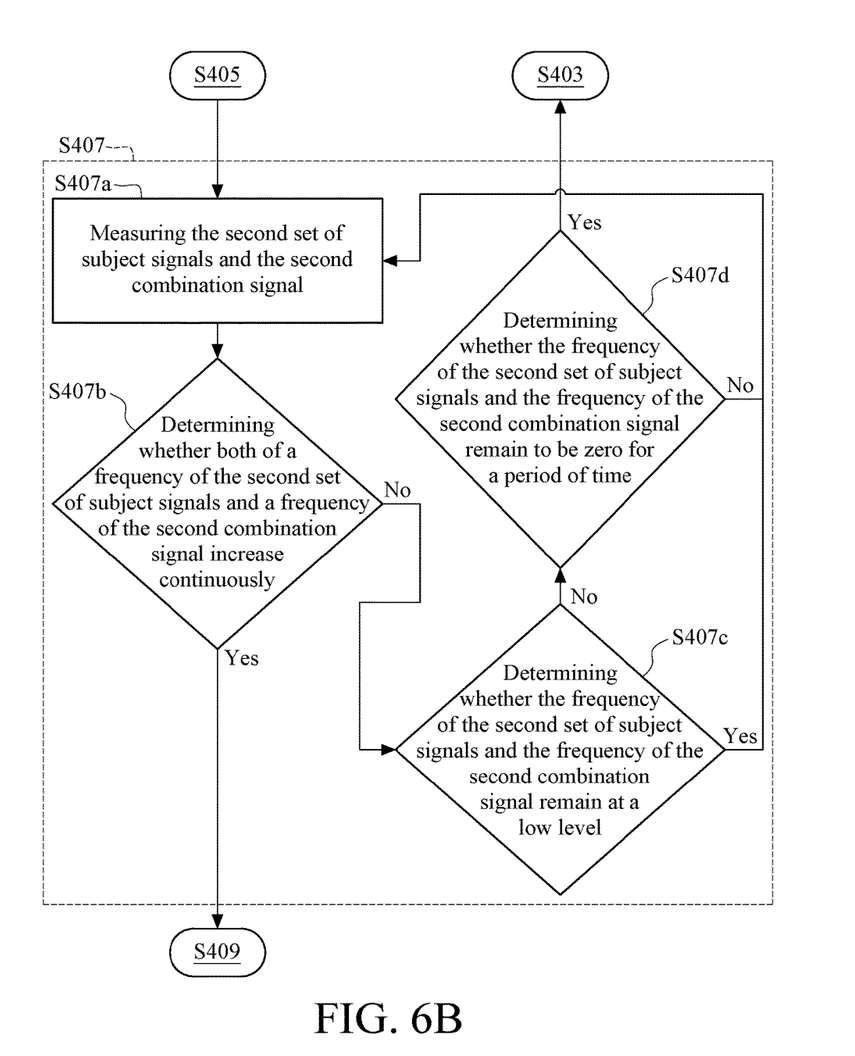
FIG. 6B is a flow chart of engine-state detection methods according to another embodiments of the present disclosure.
Figure 6C:
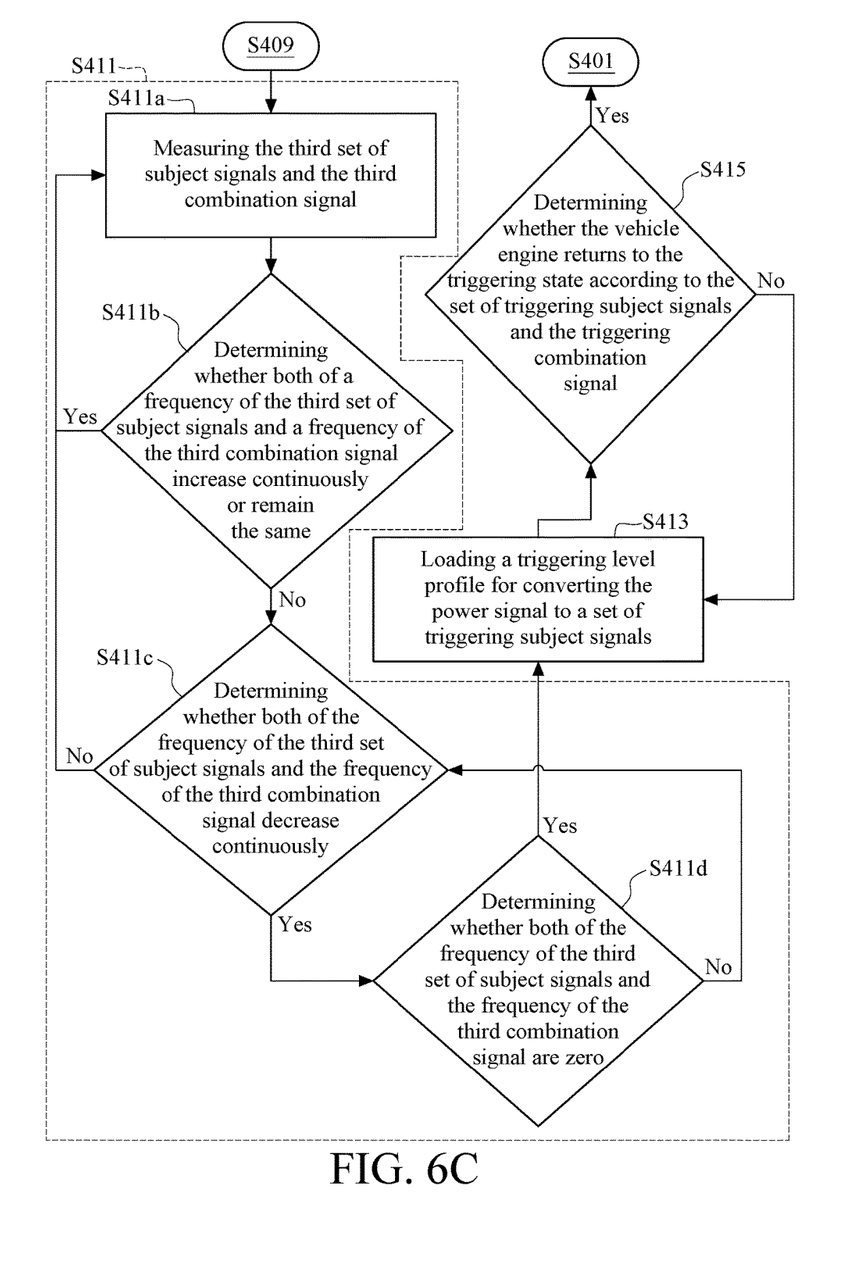
FIG. 6C is a flow chart of engine-state detection methods according to further another embodiment of the present disclosure.

Please refer to FIG. 5 and FIG. 6A to FIG. 6C. FIG. 6A to FIG. 6C are flow charts of engine-state detection methods according to embodiments of the present disclosure respectively. Those methods are adapted to the engine-state detection device 12 and the vehicle engine 10 as well as the battery module 11 in FIG. 1 and FIG. 2. Comparing to the flow chart of FIG. 4, the flow chart of FIG. 6 further shows that step S403 includes sub-step S403a and sub-step S403b. In step S403a, the controller 124 measures a pulse width WDT and a variation trend of the first set of subject signals, as well as a pulse width WDT and a variation trend of the first combination signal frequency. In the following sub-step S403b, the controller 124 determines whether the pulse width WDT conforms to a predetermined width. When the controller 124 determines that the pulse width conforms to the predetermined pulse width, it is determined that the vehicle engine enters the initial state ST2. More specifically, when a user presses a start-engine button of the vehicle, the voltage level of the battery module 11 decreases dramatically as the waveform of the triggering state ST1 indicated in FIG. 5. In this condition, the pulse waveform of the first set of subject signals is the same as the pulse waveform of the first combination signal CS1. The controller 124 measures the pulse waveforms for obtaining the pulse widths WDT and record the variation trend of frequencies. The controller 124 further compares the variation trend of the pulse widths WDT to a parameter sequence of the predetermined width. When the variation trend of the pulse widths WDT conforms to the parameter sequence of the predetermined width, the controller 124 determines that the vehicle engine enters the initial state ST2.

As FIG. 6B shown, in the embodiment, step S407 includes sub-step S407a and sub-step S407b. In sub-step S407a, the controller 124 measures the second set of subject signals as well as the second combination signal CS2. In sub-step S407b, the controller 124 determines whether a pulse frequency of the second set of subject signals and a pulse frequency of the second combination signal CS2 increase continuously, and it is indicated that the power generator of the vehicle has been started and become functional as the variation of the frequency remains stable for a period of time. When the controller 124 determines the characteristics of the second set of subject signals and the second combination signal CS2 meets the expectations, the controller 124 determines that the vehicle engine 10 enters the operation state ST3, thereby step S409 is performed. In other words, when the impulse frequency of the second set of subject signals and the impulse frequency of the second combination signal CS2 increase, it is indicated that the vehicle engine 10 is running in an operation state from a high frequency to a low frequency. In contrast, when the controller 124 determines that the frequency of the second set of subject signals and the frequency of the second combination signal CS2 do not increase continuously, the controller 124 determines whether the frequency of the second set of subject signals and the frequency of the second combination signal CS2 remain in a low frequency in sub-step S407c. If they do, then return to sub-step S407a. In contrast, if they do not, then the controller 124 determines whether the frequency of the second set of subject signals and the frequency of the second combination signal CS2 remain to be zero for a period of time in sub-step S407d. If they do, then return to step S403. If they do not, then return to sub-step S407a.

As FIG. 6C further shown, step S411 includes sub-step S411a to sub-step S411d. In sub-step S411a, the controller 124 measure the third set of subject signals and the third combination signal CS3. Then, in sub-step S411b, the controller 124 determines whether the frequency of the third set of subject signals and the frequency of the third combination signal CS3 continuously increase or remain the same. When the frequency of the third set of subject signals and the frequency of the third combination signal CS3 continuously increase or remain the same, it is indicated that the vehicle engine 10 still remains in the operation state. In this condition, return to the previous sub-step S411a. In contrast, if the frequency of the third set of subject signals and the frequency of the third combination signal CS3 do not continuously increase or remain the same, then in sub-step S411c, the controller 124 determines whether the frequency of the third set of subject signals and the frequency of the third combination signal CS3 continuously decrease. When the frequency of the third set of subject signals and the frequency of the third combination signal CS3 continuously decrease for a period of time, it is indicated that the vehicle engine 10 is in turning-off state. In this condition, in sub-step S411d, the controller 124 further determines whether both of the frequency of the third set of subject signals and the frequency of the third combination signal CS3 are zero. When both of the frequency of the third set of subject signals and the frequency of the third combination signal CS3 are zero, the controller 124 determines that the vehicle engine 10 returns to the off-state indicating that the vehicle engine 10 has stopped operating. Then, in step S413, the controller 124 performs a loading of triggering profile for converting the power signal PS to a set of triggering subject signals. In the following step S415, the controller 124 determines whether the vehicle engine 10 returns to the triggering state according to the set of triggering subject signals and the triggering combination signal. If it does, then return to step S401 for repeating steps of the engine-state detection method.

Based on the above descriptions, the engine-state detection device and the engine-state detection method disclosed in the present disclosure, by the upper bound values and the lower bound values of the level profiles, the power signal provided by the battery module is converted to two digital signals, and an algorithm is performed for the two set of digital signals to generate a combination signal, so that the controller is able to determine the state of the vehicle engine according to the waveforms and the frequencies of the two digital signals and the combination signal. Thereby, the engine-state of a vehicle could be determined through an improved method and the costs of installations and maintenances for ACC cables could be eliminated.

What is claimed is:

1. An engine-state detection device adapted to a vehicle engine, with a battery module electrically connected to the vehicle engine for providing a power signal, comprising:
   a windowed comparison circuit configured to receive the power signal and convert the power signal to one of a plurality of sets of subject signals depending on one of a plurality of level profiles, wherein each of the plurality of level profiles is related to a respective one of the plurality of sets of subject signals; and
   a controller electrically connected to the windowed comparison circuit and configured to perform an algorithm for the one of the plurality of sets of subject signals converted from the power signal for generating a combination signal correspondingly, and determine a state of the vehicle engine according to the one of the plurality of sets of subject signals and the combination signal generated correspondingly, wherein the level profile on which the windowed comparison circuit depends is determined by the controller;
   wherein the one of the plurality of sets of subject signals includes a first digital signal and a second digital signal, the level profile on which the windowed comparison circuit depends includes a first reference signal and a second reference signal, the first reference signal has an upper bound value related to the first digital signal, and the second reference signal has a lower bound value related to the second digital signal.

2. The engine-state detection device according to claim 1, wherein the windowed comparison circuit comprises:
   a first comparator having a first end, a second end and a third end, with the first end of the first comparator configured to receive the power signal, the second end of the first comparator configured to receive the first reference signal from a first output terminal of the controller, the first comparator configured to generate a first digital signal according to the upper bound value of the first reference signal and the power signal, and output the first digital signal to a first input terminal of the controller through the third end of the first comparator; and a second comparator having a first end, a second end and third end, with the first end of the second comparator configured to receive the second reference signal from a second output terminal of the controller, the second end of the second comparator configured to receive the power signal, the second comparator configured to generate the second digital signal according to the lower bound value of the second reference signal and the power signal, and output the second digital signal to a second input terminal of the controller through the third end of the second comparator;

wherein the algorithm performed by the controller for the set of subject signals including the first digital signal and the second digital signal is a logic algorithm or an artificial intelligence self-learning algorithm, and the artificial intelligence self-learning algorithm is configured to generate the combination signal by adjusting weights of the algorithm.

3. The engine-state detection device according to claim 1, wherein the plurality of level profiles comprises a first level profile, a second level profile and a third level profile, the plurality of sets of subject signals comprises a first set of subject signals, a second set of subject signals and a third set of subject signals, the first level profile is adjusted by the controller for generating the second level profile when the windowed comparison circuit converts the power signal to the first set of subject signals depending on the first level profile and determines that the vehicle engine enters an initial state according to the first set of subject signals and the combination signal correspondingly generated by performing the algorithm for the first set of subject signals; the second level profile is adjusted by the controller for generating the third level profile when the windowed comparison circuit converts the power signal to the second set of subject signals depending on the second level profile and determines that the vehicle engine enters an operation state according to the second set of subject signals and the combination signal correspondingly generated by performing the algorithm for the second set of subject signals.

4. The engine-state detection device according to claim 3, wherein the controller determines whether the vehicle engine turns into to an off-state according to the third set of subject signals and the combination signal correspondingly generated by performing the algorithm for the third set of subject signals when the windowed comparison circuit converts the power signal to the third set of subject signals depending on the third level profile.

5. The engine-state detection device according to claim 3, wherein the upper bound value of the third level profile is greater than the upper bound value of the first level profile and the upper bound value of the second level profile, and the lower bound value of the third level profile is greater than the lower bound value of the first level profile and the lower bound value of the second level profile.

6. An engine-state detection method adapted to a combination of an engine-state detection device and a vehicle engine, with a battery module electrically connected to the vehicle engine for providing a power signal thereto, comprising:

loading a first level profile for converting the power signal to a first set of subject signals according to a first level profile when the vehicle engine is in a triggering state;

determining whether the vehicle engine enters an initial state according to the first set of subject signals and a first combination signal generated correspondingly;

loading a second level profile for converting the power signal to a second set of subject signals when it is determined that the vehicle engine enters the initial state;

determining whether the vehicle engine enters an operation state according to the second set of subject signals and a second combination signal generated correspondingly;

loading a second level profile for converting the power signal to a third set of subject signals when it is determined that the vehicle engine enters the operation state;

determining whether the vehicle engine returns an off-state according to the third set of subject signals and a third combination signal generated correspondingly;

loading a triggering level profile for converting the power signal to a set of triggering subject signals when it is determined that the vehicle engine enters the off-state; and determining whether the vehicle engine returns to the triggering state according to the set of triggering subject signals and a triggering combination signal generated correspondingly;

wherein each of the first set of subject signals, the second set of subject signals and the third set of subject signals has a first digital signal and a second digital signal, with each of the first level profile, the second level profile and the third level profile having an upper bound value and a lower bound value correspondingly, each of the upper bound values is configured to compare to the power signal for generating one of the first digital signal of the first set of subject signals, the first digital signal of the second set of subject signals and the first digital signal of the third set of subject signals, and each of the lower bound values is configured to compare to the power signal for generating one of the second digital signal of the first set of subject signals, the second digital signal of the second set of subject signals and the second digital signal of the third set of subject signals.

7. The engine-state detection method according to claim 6, wherein the first level profile, the second level profile, the third level profile and the triggering level profile are determined by an artificial intelligence self-learning algorithm.

8. The engine-state detection method according to claim 6, wherein determining whether the vehicle engine enters the initial state according to the first set of subject signals and the first combination signal generated correspondingly comprises:

measuring a pulse width and a variation trend of the first set of subject signal as well as a pulse width and a variation trend of the first combination signal; and determining whether the pulse width of the first set of subject signal and the pulse width of the first combination signal conform to a predetermined width.

9. The engine-state detection method according to claim 6, wherein determining whether the vehicle engine enters the operation state according to the second set of subject signals and the second combination signal generated correspondingly comprises:

measuring the second set of subject signals and the second combination signal; and determining whether both of a frequency of the second set of subject signals and a frequency of the second combination signal increase continuously.

10. The engine-state detection method according to claim 6, wherein determining whether the vehicle engine returns the off-state according to the third set of subject signals and the third combination signal generated correspondingly comprises:

measuring the third set of subject signals and the third combination signal;

determining whether both of a frequency of the third set of subject signals and a frequency of the third combination signal increase continuously or remain the same;

determining whether both of the frequency of the third set of subject signals and the frequency of the third combination signal decrease continuously when both of the frequency of the third set of subject signals and the frequency of the third combination signal do not increase continuously and do not remain the same; and determining whether both of the frequency of the third set of subject signals and the frequency of the third combination signal are zero when both of the frequency of the third set of subject signals and the frequency of the third combination signal decrease continuously for a period of time.

11. The engine-state detection method according to claim 6, wherein the upper bound value of the third level profile is greater than the upper bound value of the first level profile and the upper bound value of the second level profile, and the lower bound value of the third level profile is greater than the lower bound value of the first level profile and the lower bound value of the second level profile.

* * * * *